United States Patent Office 3,812,182
Patented May 21, 1974

3,812,182
S-BIS-(2-LOWER ALKYL AMINO HYDROXY-METHYLETHOXY)-METHANES
Leonard M. Weinstock, Belle Mead, Roger J. Tull, Metuchen, and Dennis M. Mulvey, Whitehouse Station, N.J., assignors to Charles E. Frosst & Co., Kirkland, Quebec, Canada
No Drawing. Application Aug. 16, 1971, Ser. No. 172,232, which is a division of application Ser. No. 818,474, Apr. 21, 1969, now Patent No. 3,657,237. Divided and this application June 18, 1973, Ser. No. 370,994
Int. Cl. C07d 87/46
U.S. Cl. 260—584 R       2 Claims

ABSTRACT OF THE DISCLOSURE

Preparation of S-3-X-4-(3-substituted amino-2-hydroxypropoxy) - 1,2,5 - thiadiazole beta adrenergic blocking agents using as starting material an optically active alkamine in the sinister configuration, or a derivative of said alkamine, which is reacted with an 3-X-4-chloro-1,2,5-thiadiazole. Novel 3-morpholino - 4 - chloro-1,2,5-thiadiazoles and novel alkamines and their preparation also are described.

---

This is a division of application Ser. No. 172,232, filed Aug. 6, 1971, which, in turn, is a divisional of U.S. Application Ser. No. 818,474, filed Apr. 21, 1969, now Pat. No. 3,657,237, issued Apr. 18, 1972.

This invention is concerned with a novel and commercially feasible method for preparing the biologically active, S-enantiomer of a 3-X-4-(3-substituted amino-2-hydroxypropoxy)-1,2,5-thiadiazole product. Substantially all of the biological activity of these products resides in the S-enantiomer which was obtained by other workers by the resolution of the racemic product or by the resolution of intermediates employed in their synthesis. These prior methods offer several disadvantages, principally the need to use cyanogen for the synthesis of the intermediate 3-chloro-4-hydroxy-1,2,5-thiadiazole, an important intermediate, as well as the need to resolve the 3-X-4-(3-substituted amino-2-hydroxypropoxy)-1,2,5-thiadiazole derivate thereof. It is well known that resolution procedures are uneconomical as they provide low yields of active material because half of the yield of racemic product formed is of no value, and at least some of the desired isomer is not recoverable by feasible large scale procedures.

This invention therefore is concerned principally with the preparation of optically active 3-X-4-(3-substituted amino - 2 - hydroxypropoxy) - 1,2,5-thiadiazoles utilizing in the synthesis thereof derivatives of optically active carbohydrates thus avoiding all of the difficulties encountered by other workers in the resolution of the end product itself or the need to resolve racemic compounds at any stage of the synthesis of the active end products, or the need to employ cyanogen in the syntheses of the thiadiazole starting material.

The invention also is concerned with a novel method for preparing 3-X-4-hydroxy-1,2,5-thiadiazole, as well as a novel method for preparing the optically active R¹-alkamines.

According to the principal process of this invention a 1,2,5-thiadiazole, structure I, is reacted with an optically active alkamine of the sinister (S) configuration, structure II, to provide product III in the sinister configuration; thus the reaction can be illustrated by the following scheme:

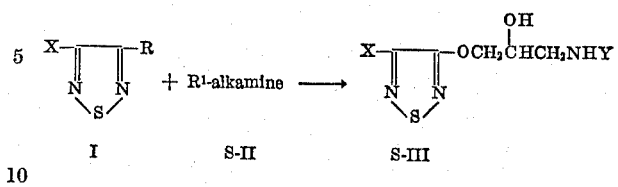

wherein $R^1$ is HO— or (alkali metal-O-) and R is a chloro. X in the above structures represents chloro, lower alkyl having 1 to 3 carbon atoms, lower alkoxy having from 1 to 3 carbon atoms, phenyl, benzyl, morpholino, piperidyl, hydroxy-piperidyl, and N-lower alkyl piperazinyl; and Y is a straight or branched chain lower alkyl having from 1 to 5 carbon atoms which is optionally hydroxy substituted.

When in the foregoing reaction scheme R in the thiadiazole I is chloro then the $R^1$-alkamine advantageously is an S - 2,2′ - methylene bis-3-(Y-amino-1,2-propanediol known as S - bis - [2-(Y-amino)-1-hydroxymethylethoxy]-methane.

When R in compound I is chloro and $R^1$ in compound II represents the reactive hydroxyl group, the optically active product, S–III, is prepared by the reaction of the thiadiazole I and the S-alkamine, S–II, in the presence of a strong base. The reaction preferably is carried out at ambient temperature although the reaction mixture either can be heated up to reflux temperature if desired, or cooled to 0° C. A solvent for the reactants is desirable and any conventional solvent can be employed for this purpose; suitable ones being polar aprotic solvents such as dimethylformamide (DMF), dimethyl sulfoxide (DMSO), tetrahydrofuran (THF), hexamethylphosphoramide (HMP); lower alkanols and the like. The readily available and relatively inexpensive tert-butanol has been found to be a quite suitable, general purpose solvent for these intermediates. Strong bases that are recommended for use in the reaction are alkali metal alkoxides or alkali metal hydroxides preferably the sodium or potassium alkoxides or hydroxides, or sodium hydride. When product S–III in the form of the free base is obtained as an oil, crystalline material can be prepared by forming the salt by known methods. Suitable salts are those formed with mineral acids or organic acids such as for example the hydrochloride salt, the sulfate salt, the hydrogen maleate salt or other desired mineral or organic acid salt.

The thiadiazole starting substance I wherein R is chloro (and the 3-position substituent is morpholino, a piperidyl or a piperazinyl) can be made by a novel method that represents another feature of this invention. According to this method, when R in the thiadiazole I is chloro, 3,4-dichloro-1,2,5-thiadiazole is reacted with morpholine, or the selected piperidine or piperazine, preferably with heating from about 80° C. to about 150° C., optimally at about 100° C. to provide 3-morpholino-(piperidyl- or piperazinyl) - 4-chloro-1,2,5-thiadiazole. While morpholine, piperidine, or piperazine can be employed in excess for their solvent properties, other conventional organic solvents can be employed for this purpose.

The novel method for the preparation of 3-morpholino-(piperidyl- or piperazinyl)-4-chloro-1,2,5-thiadiazole provides the desired compound in very high yield.

PREPARATION OF S-3-X-4-[3-(Y-AMINO)-2-HYDROXYPROPOXY] - 1,2,5 - THIADIAZOLE VIA 3-X-4-CHLORO-1,2,5-THIADIAZOLE

Example 1

Step A: Preparation of S-2,2'-methylene bis-3-*tert*-butylamino - 1,2 - propanediol (S-bisamine).—A solution of 2,5-methylene-D-mannitol (6.0 g.; 0.031 mole) in anhydrous methanol (75 ml.) is prepared and cooled to 0–5° C. This solution is stirred while adding lead tetraacetate (13.7 g.; 0.031 mole) and while maintaining the temperature at about 10° C. After the oxidant has been added, the mixture is aged 1 hour at 10° C. whereupon it was found by testing with starch-iodide paper that the oxidant had been completely consumed. The reaction mixture then is cooled to 0° C. and tetramethylammonium chloride (7.2 g.; 0.066 mole) is added. The reaction mixture is aged an additional hour at 0–5° C. and then filtered cold. The filter cake is washed with two 10 ml. portions of precooled anhydrous methanol, the filtrates combined and added dropwise to a mixture of *tert*-butylamine (11.3 g.; 0.155 mole) in anhydrous methanol (12 ml.) while hydrogenating at an initial pressure of 40 p.s.i. over palladium-on-carbon (1.2 g. of 5%). The addition rate is such that about 1 hour is required for the addition. The reduction is continued until 1 hour after hydrogen uptake ceases (generally 6–10 hours in all). The reaction then is filtered free of catalyst, the catalyst washed with 20 ml. of anhydrous methanol and the combined filtrates then evaporated *in vacuo* to a volume of about 25 ml. This residue is treated with a solution of sodium carbonate (14.8 g.; 0.14 mole) in water (75 ml.) and the solution then extracted with three 30 ml. portions of methylene chloride. After drying over magnesium sulfate, evaporation of the methylene chloride extracts *in vacuo* leaves a viscous colorless oil that slowly crystallizes yielding 8.75 g. (92.5% yield) of S-2,2'-methylene bis-3-*tert*-butylamino-1,2-propanediol also known as S-bis-(2-*tert*-butylamino - 1 - hydroxymethylethoxy)-methane (S-bisamine) which by vapor pressure chromatography (vpc) is found to be 95% pure. A sample obtained by recrystallization from n-heptane melts at 62–63.5° C.

*Analysis.*—Calculated for $C_{15}H_{34}N_2O_4$: C, 58.78; H, 11.18; N, 9.14. Found: C, 58.59; H, 10.90; N, 9.32.

By replacing the *tert*-butylamine employed in Step A by an equivalent quantity of isopropylamine, 2,2-dimethylpropylamine, and 1,1-dimethyl - 2 - hydroxyethylamine and following substantially the same procedure described in Step A, there is obtained, respectively, the 3-isopropylamino-, 3-(2,2-dimethylpropylamino)- and the 3-(1,1-dimethyl-2-hydroxyethylamino)- analogs of bisamine.

Step B: Preparation of 3-morpholino - 4 - chloro-1,2,5-thiadiazole.—3,4-dichloro - 1,2,5 - thiadiazole (100.0 g.; 0.645 mole) is added dropwise over a 30-minute period at 105–110° C. to morpholine (224 ml.; 2.58 mole). After the addition, the mixture is stirred 2 hours at 105–110° C., then cooled to 15° C. and quenched with water (250 ml.). This mixture then is made acidic with concentrated hydrochloric acid (250 ml.) whereupon an insoluble oil soon crystallizes to a heavy solid mass. After crystallization is complete the solid is filtered and washed with water and then dried at 35° C. *in vacuo* yielding 125.5 g. (95%) of 3-morpholino - 4 - chloro-1,2,5-thiadiazole, M.P. 43–45° C.

By replacing morpholine in the above reaction with an equivalent quantity of N-methylpiperazine, piperidine and 4-hydroxypiperidine and then following substantially the same method there is obtained, respectively, 3-(4-methylpiperazinyl)-4-chloro-1,2,5-thiadiazole,
3-piperidyl-4-chloro-1,2,5-thiadiazole, and
3-(4-hydroxypiperidyl)-4-chloro-1,2,5-thiadiazole.

Step C: Preparation of S(−)-3-morpholino-4-(3-*tert*-butylamino - 2 - hydroxypropoxy)-1,2,5-thiadiazole and its hydrogen maleate salt.—A solution of 3-morpholino-4-chloro-1,2,5-thiadiazole (2.06 g.; 0.01 mole) and S-bisamine (1.53 g.; 0.005 mole) in anhydrous dimethylformamide (15 ml.) is cooled to 0° C. To the solution is added sodium hydride (0.21 g.; 0.005 mole of 56.8% NaH). Stirring is continued while maintaining the temperature between 0–5° C. When testing with phenolphthalein paper shows the absence of strong base, a second portion of sodium hydride (0.21 g.) is added. After an additional hour, the reaction is quenched on 30 ml. of 4.0 N hydrochloric acid and extracted with two 50 ml. portions of ether. The aqueous solution then is refluxed for 2 hours, cooled, and the solution brought to ca. pH 9 with concentrated ammonium hydroxide and then extracted with three 40 ml. portions of methylene chloride. After drying over magnesium sulfate and evaporation *in vacuo* there is obtained 2.29 g. (72.5% yield) of S(−)-3-morpholino-4-(3-*tert* - butylamino)-2-hydroxypropoxy)-1,2,5-thiadiazole. This is converted to its hydrogen maleate salt by treatment with maleic acid (0.85 g.; 0.0073 mole) in tetrahydrofuran (3 ml.) to give 2.14 g. (49.5%) S(−)-3-morpholino-4-(3 - *tert*-butylamino-2-hydroxypropoxy)-1,2,5-thiadiazole hydrogen maleate.

By replacing the maleic acid employed in the above procedure by hydrochloric acid, sulfuric acid, tartaric acid or any other desired acid the corresponding acid salt is formed. When sulfuric acid is employed in the ratio of 1 mole of acid to 2 moles of thiadiazole the sulfate salt of S(−)-3-morpholino-4-(3-*tert*-butylamino - 2 - hydroxypropoxy)-1,2,5-thiadiazole is obtained, M.P. 253.5–254° C. $[\alpha]_{405}$ −13.8° [c.=1, 1 N HCl].

By replacing the 3-morpholino - 4 - chloro-1,2,5-thiadiazole employed in Step C by equivalent quantities of the 3-chloro-, 3-ethyl-, 3-ethoxy-, 3-phenyl-, 3-benzyl-, 3-(4-methylpiperazinyl)-, 3-piperidyl-, or 3-(4-hydroxypiperidyl) analogs thereof and following substantially the same procedure described in Step C there is obtained the 3-X-4-(3-*tert* - butylamino - 2 - hydroxypropoxy)-1,2,5-thiadiazole where in X is chloro, ethyl, ethoxy, phenyl, benzyl, 4-methylpiperazinyl, piperidyl and 4-hydroxypiperidyl, respectively.

The S-3-X-4-[3-(Y - amino)-2-hydroxypropoxy]-1,2,5-thiazole compounds prepared by the process of this invention as well as their salts have been found to exhibit β-adrenergic blocking properties and are thus useful in the management of angina pectoris. Because of this property the optically active products are useful for the control of tachycardia that may be drug induced (as by isoproterenol) or brought about by physiological conditions.

The optically active products particularly in the form of their salts can be prepared in pharmaceutical formulations suitable for oral or parenteral administration and also can be combined with other active ingredients for simultaneous administration. No special problems are involved in preparing suitable formulations of the optically active compounds or salts thereof and methods generally employed for this purpose, which are known to those skilled in this art, are entirely suitable. Dosage units of from about 2 mgs. to about 10 mgs. can be provided for the symptomatic adjustment of dosage of the optically active substances by the physician depending upon the age and condition of the patient.

Illustrative examples of suitable pharmaceutical compositions containing S(−)-3-morpholino-4-(3 - *tert*-butylamino - 2 - hydroxypropoxy)-1,2,5-thiadiazole hydrogen maleate as active ingredient follow. Each of the compositions are prepared by conventional methods, and the quantities recited are for each unit dosage. The other optically active products prepared as hereinbefore described can be similarly formulated.

INJECTABLE SOLUTION

| | Mg. |
|---|---|
| Active compound | 1 |
| Sodium chloride | 9 |
| Distilled water q.s. 1.0 ml. | |

CAPSULES

| | |
|---|---|
| Active compound | 5 |
| Magnesium stearate | 2.0 |
| Lactose U.S.P. | 19.3 |

What is claimed is:

1. An S-2,2'-methylene bis-2-(Y - amino)-1,2-propanediol wherein Y is a straight or branched chain lower alkyl or an hydroxy substituted straight or branched chain lower alkyl.

2. S - 2,2'-methylene bis-2-*tert*-butylamino-1,2-propanediol.

References Cited

UNITED STATES PATENTS 3,213,088   10/1965   Menzl _____ 260—239.95

LEWIS GOTTS, Primary Examiner

D. R. PHILLIPS, Assistant Examiner

U.S. Cl. X.R.

260—239.95, 247.1, 268 H, 293.68, 293.4 E, 302 D; 424—248